(12) United States Patent
Hetzler et al.

(10) Patent No.: US 8,484,408 B2
(45) Date of Patent: Jul. 9, 2013

(54) STORAGE SYSTEM CACHE WITH FLASH MEMORY IN A RAID CONFIGURATION THAT COMMITS WRITES AS FULL STRIPES

(75) Inventors: Steven Robert Hetzler, Los Altos, CA (US); Daniel Felix Smith, Felton, CA (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/981,288

(22) Filed: Dec. 29, 2010

(65) Prior Publication Data
US 2012/0173790 A1 Jul. 5, 2012

(51) Int. Cl.
*G06F 12/00* (2006.01)
*G06F 13/00* (2006.01)

(52) U.S. Cl.
USPC ............ 711/103; 711/113; 711/114; 711/118

(58) Field of Classification Search
USPC .................................. 711/103, 113, 114, 118
See application file for complete search history.

(56) References Cited

U.S. PATENT DOCUMENTS

| | | | |
|---|---|---|---|
| 7,051,156 B2 * | 5/2006 | Shang | ............................ 711/114 |
| 7,308,531 B2 | 12/2007 | Coulson | |
| 7,502,886 B1 | 3/2009 | Kowalchik et al. | |
| 2006/0004957 A1 | 1/2006 | Hand et al. | |
| 2008/0126700 A1 | 5/2008 | El-Batal et al. | |
| 2009/0204872 A1 | 8/2009 | Yu et al. | |
| 2009/0210620 A1 | 8/2009 | Jibbe et al. | |
| 2009/0276567 A1 | 11/2009 | Burkey | |
| 2010/0125695 A1 * | 5/2010 | Wu et al. | ........................ 711/103 |
| 2011/0225353 A1 * | 9/2011 | Elliott et al. | ................... 711/103 |

FOREIGN PATENT DOCUMENTS

| | | |
|---|---|---|
| CN | 201237907 Y | 5/2009 |
| JP | 2009163647 A | 7/2009 |

* cited by examiner

*Primary Examiner* — Hong Kim
(74) *Attorney, Agent, or Firm* — Mohammed Kashef

(57) ABSTRACT

Embodiments of the invention relate to a storage system cache with flash memory units organized in a RAID configuration. An aspect of the invention includes a storage system with a storage cache that includes flash memory units organized in an array configuration. The storage system further includes an array controller that manages data access and data operations for the flash memory units and organizes data as full array stripes. The storage system also includes a storage cache controller, that includes a block line manager that buffers write data to be cached for a write operation until the storage cache controller has accumulated an array band, and commits write data to the array controller as full array stripes. The storage cache controller determines whether to store write data for a write in the storage cache and/or in the primary storage device and whether to access read data from the storage cache or from the primary storage device.

25 Claims, 6 Drawing Sheets

500

| 502 | 501 | |
|---|---|---|
| 0 | 0 | |
| 1 | 1 | |
| 2 | 2 | |
| ... | ... | 506 |
| 14 | 14 | |
| 15 | Check C0 | |
| 16 | 15 | |
| 17 | 16 | |
| 18 | 17 | 508 |
| ... | ... | |
| 30 | 29 | |
| 31 | CheckC1 | |

FIG. 5

STORAGE SYSTEM CACHE WITH FLASH MEMORY IN A RAID CONFIGURATION THAT COMMITS WRITES AS FULL STRIPES

BACKGROUND

Embodiments of the invention relate to the field of data storage, and in particular, to caching data in a storage cache with flash memory units organized in a RAID configuration.

A cache is a small high-speed memory device interposed between a processor and a larger but slower device, such as main memory or storage. Storage caches temporarily store data that is frequently accessed by host systems from a storage system, which make repeated references to the same data. A cache, during write operations, typically holds write data before it is destaged to primary storage. A cache, during read operations, caches read data after an initial access to data from the storage system's primary storage. Subsequent accesses to the same data will be made to the storage cache. A storage cache allows read data in a storage system to be accessed in a shorter amount of time by a host client system by reducing the number of wait states during data accesses.

Flash memory is a type of non-volatile memory. In particular, flash memory is a type of Electrically Erasable Programmable Read Only Memory (EEPROM) device that can be electrically erased and reprogrammed in blocks. Flash memory has features of the Random Access Memory (RAM) because data is rewritable on flash memory. Flash memory also has features of Read Only Memory (ROM) because flash memory devices are non-volatile. Memory cells are arranged in blocks for erasure and after a block has been erased, the block is available to be reprogrammed. Flash memory has become an increasingly popular form of non-volatile memory because of the flash memory's small size, fast access speeds, shock resistance, and light weight.

BRIEF SUMMARY

Embodiments of the invention relate to a storage system cache with flash memory units organized in a RAID configuration. An aspect of the invention includes a storage system comprising a storage system cache with flash memory in a RAID configuration. The storage system includes a storage cache comprising a plurality of flash memory units organized in an array configuration. Each of the plurality of flash memory units comprising a plurality of flash memory devices and a flash unit controller. Each flash unit controller manages data access and data operations for its corresponding flash memory devices. The storage system further includes an array controller coupled to the plurality of flash memory units. The array controller manages data access and data operations for the plurality of flash memory units and organizes data as full array stripes. The storage system further includes a primary storage device, which is coupled to the array controller, and stores data for the storage system.

The storage system further includes a storage cache controller that is coupled to the array controller. The storage cache controller comprises a block line manager that buffers write data to be cached for a write operation until the storage cache controller has accumulated an array band, and commits write data to the array controller as full array stripes. The storage cache controller receives storage commands from at least one host system. The storage cache controller determines for a write data storage command, whether to store write data in the storage cache and/or in the primary storage device, and for a read data storage command, whether to access read data from the storage cache or from the primary storage device.

Another aspect of the invention includes a method for caching data using a storage system cache with flash memory organized in a RAID configuration. The method includes managing data access and data operations for a storage cache of a storage system. The storage cache is provisioned as a plurality of flash memory units organized in an array configuration, and each of the plurality of flash memory units comprises a plurality of flash memory devices. The method further includes receiving at least one storage command from a host system and. For a write data storage command, the method determines whether to store write data in the storage cache and/or in a primary storage device of the storage system. If the write data is to be stored in the storage cache, the method includes buffering the write data until a storage cache controller has accumulated an array band, and committing the write data to an array controller as full array stripes. For a read data storage command, the method determines whether to access the read data from the storage cache or from the primary storage device.

Another aspect of the invention includes a computer program product for caching data using a storage system cache with flash memory organized in a RAID configuration. The computer program product includes computer readable program code configured to manage data access and data operations for a storage cache of a storage system. The storage cache is provisioned as a plurality of flash memory units organized in an array configuration, and each of the plurality of flash memory units comprises a plurality of flash memory devices. The computer program product further includes computer readable program code configured to receive at least one storage command from a host system. For a write data storage command, the computer program product further includes computer readable program code configured to determine whether to store write data in the storage cache and/or in a primary storage device of the storage system. If the write data is to be stored in the storage cache, the write data is buffered until a storage cache controller has accumulated an array band, and the write data is committed to an array controller as full array stripes. For a read data storage command, the computer program product further includes computer readable program code configured to determine whether to access the read data from the storage cache or from the primary storage device.

BRIEF DESCRIPTION OF THE SEVERAL VIEWS OF THE DRAWINGS

FIG. 5 is a lookup table of flash memory write page assignments with in-line data integrity checks to verify consistency of read data from a storage cache comprised of flash memory units organized in a RAID configuration, according to one embodiment.

DETAILED DESCRIPTION

Figure 1:
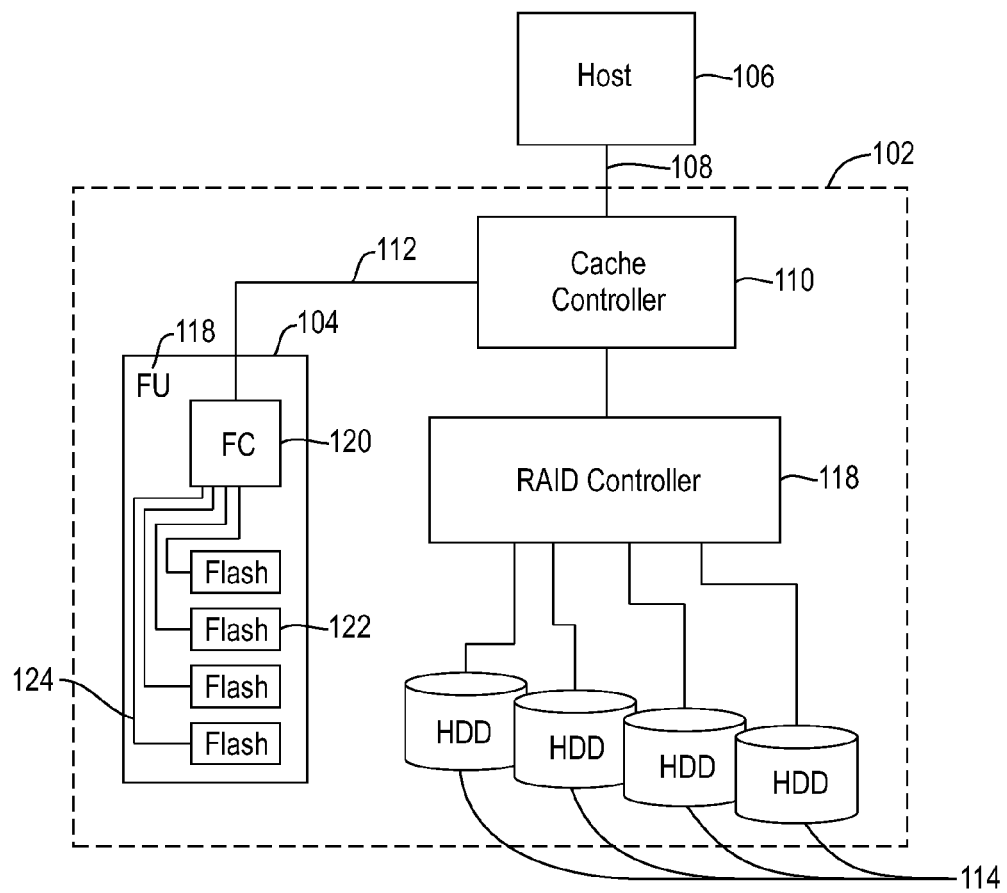
FIG. 1 is a diagram of an exemplary storage system with a storage cache comprised of flash memory.

Embodiments of the invention relate caching data in a storage cache with flash memory units organized in a RAID configuration. The present invention is a storage system with a storage cache comprised of flash memory units organized in a RAID configuration. Flash memory (e.g., NAND) has a potential for significantly improving storage system performance, however, flash memory is significantly more expensive than permanent storage (HDD) at the same storage capacity. Therefore, it is impractical to use flash memory to replace hard disks in a large fraction of storage systems. Furthermore, using flash memory to cache storage significantly increases costs of storage systems. Flash memory does have significant benefits in a storage system design using a small amount of flash memory as a storage cache for the permanent storage.

In addition, flash memory devices suffer from finite write endurance, and limited data lifetime. Furthermore, flash memory devices do not support direct overwrite of data and have write performance that is significantly lower than the read performance. These limitations require flash controllers to support advanced functions. For example, wear leveling, over provisioning, out of order writing, pre-erased areas, garbage collection, etc. However, implementing these features add costs, through effects such as over provisioning, buffering and parallelism. In addition, a flash memory unit is not aware that it is being used as a storage cache, and thus must assume that any data may reside permanently in the flash memory. Furthermore, most enterprise flash units are comprised of single level cell (SLC) NAND flash, which is significantly more expensive than the consumer grade multi-level cell (MLC) NAND flash.

The present invention reduces costs using a caching system that is architected to avoid most of the weaknesses in flash memory, while enhancing the performance of a disk array. In addition, the invention uses a RAID layer to provide robustness. The caching operations are coupled with both the flash memory and the RAID array configuration to address the limitations in using flash memory as a storage cache in storage systems. In addition, the enhanced RAID layer above the flash memory units, used by the storage system of the present invention, will provide protection against flash memory unit failure, and will allow for hot replacing flash units.

Longer-term data persistence is not a requirement using a storage system of the present invention because only cache-related data will be stored in flash memory. For example, shorter periods of time will be sufficient to retain the data in cache, instead of requiring the data to reside in permanent storage for years. Embodiments of the invention use a log-structured approach to writing cache data to maximize the use of stream writing and avoid small block random writes that significantly reduce performance. There will be minimal burden on the limited wear leveling available in consumer grade flash units such as e-SATA keys using the storage system of the present invention. Accordingly, embodiments of the invention will allow for low-cost consumer-grade flash devices to be used as the cache media for storage systems.

FIG. 1 is a diagram of an exemplary storage system 100 with a storage cache 102 comprised of flash memory devices 122 in a flash memory unit 118. At least one host system 106 communicates with the storage system 102 over bus 108. The storage system 102 includes a storage cache controller 110, which directs data access requests to the storage cache 104 over bus 112 and/or to permanent storage (HDD) 114 over bus 116, as required. The storage cache 104 comprises a flash memory unit 118. The flash memory unit 118 comprises a flash memory unit controller 120 and flash memory devices 122. The flash memory controller 120 communicates with the flash memory devices 122 over buses 124.

Figure 2:
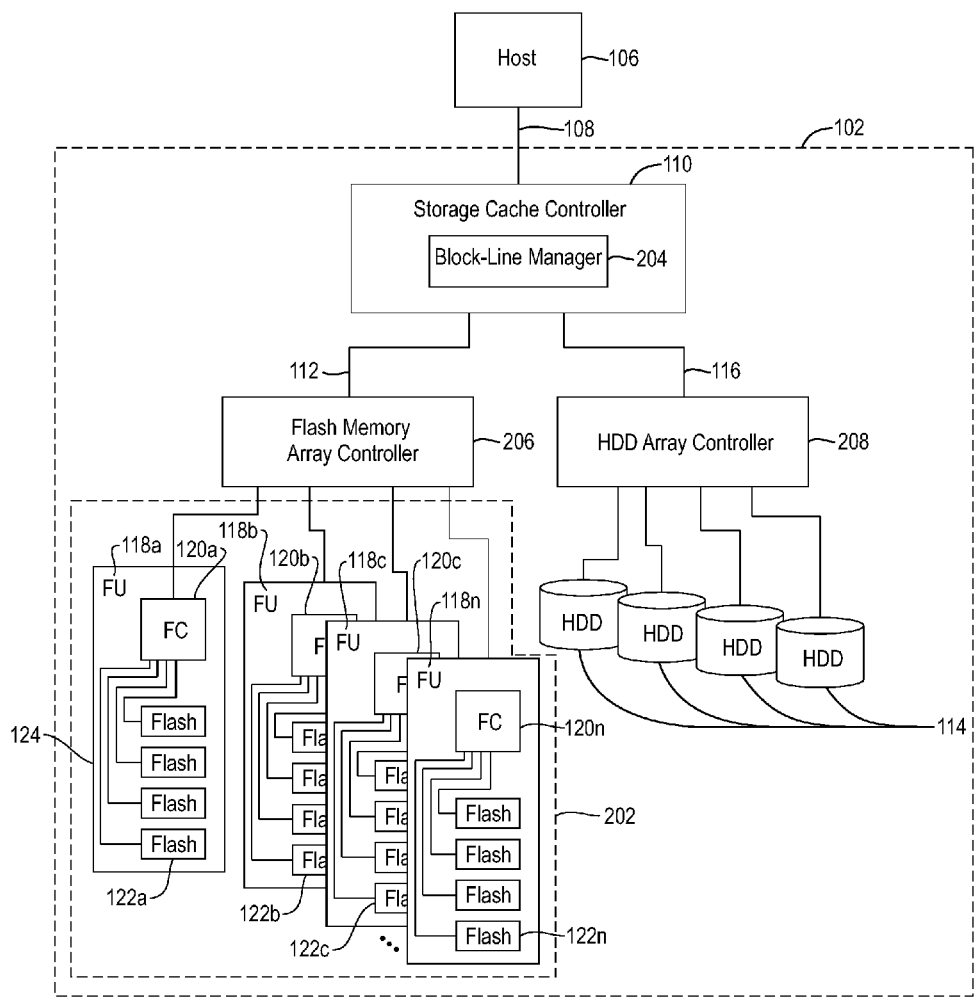
FIG. 2 is a diagram of a storage system with a storage cache comprised of flash memory units organized in a RAID configuration, accordingly to one embodiment.

FIG. 2 is a diagram 200 of a storage system 102 with a storage cache 202 comprised of flash memory units 118a, 118b, 118c . . . 118n organized in a RAID configuration, accordingly to one embodiment. A host system 106 communicates with the storage system 102 over bus 108. The storage system 102 comprises flash memory units 118a, 118b, 118c . . . 118n (e.g., consumer-grade flash units). Each of the flash memory units 118a, 118b, 118c . . . 118n comprise a flash memory unit controller 120a, 120b, 120c . . . 120n and a plurality of flash devices 122a, 122b, 122c . . . 122n.

The flash memory units 118a, 118b, 118c . . . 118n are coupled to a flash array controller 206 over bus 208. The storage system 102 further comprises a storage cache controller 110. For example, the storage cache's 110 functionality is optimized for the behavior of flash chips behind a flash memory array controller 206.

In another embodiment, the storage system 102 comprises a single array controller comprised of the flash memory array controller 206 and the HDD array controller 208. For example, the HDD array controller 208 comprises the functionality of the flash memory array controller 206. In the embodiment with a single array controller, the flash memory units 118a, 118b, 118c . . . 118n are coupled directly to that single array controller permanent storage array controller, the HDD array controller 208, rather than a dedicated flash memory array controller 206. In the embodiment with a single array controller, the flash memory units 118a, 118b, 118c . . . 118n are coupled directly to the single array controller (e.g., the permanent storage array controller, the HDD array controller 208) rather than a dedicated flash memory array controller 206. In the embodiment with a single array controller, the single array controller supports both the storage cache 202 and the primary storage (HDD) 114.

In one embodiment, the storage cache controller 110 comprises a block-line manager (BLM) 204. In another embodiment, the flash memory array controller 206 comprises the BLM 204. For example, the BLM is embodied in software and resides on either the hardware of the storage cache controller 110 or the flash memory array controller 206. The flash memory units 118a, 118b, 118c . . . 108n function as a read data cache and write data cache for the storage system 102. The storage system 102 comprises primary storage (HDD) 114, which is coupled to the HDD array controller 208. The primary storage (HDD) 114 serves as the permanent data storage repository for the storage system 102. The HDD array controller is coupled to the cache controller 110 over bus 116.

Figure 3:
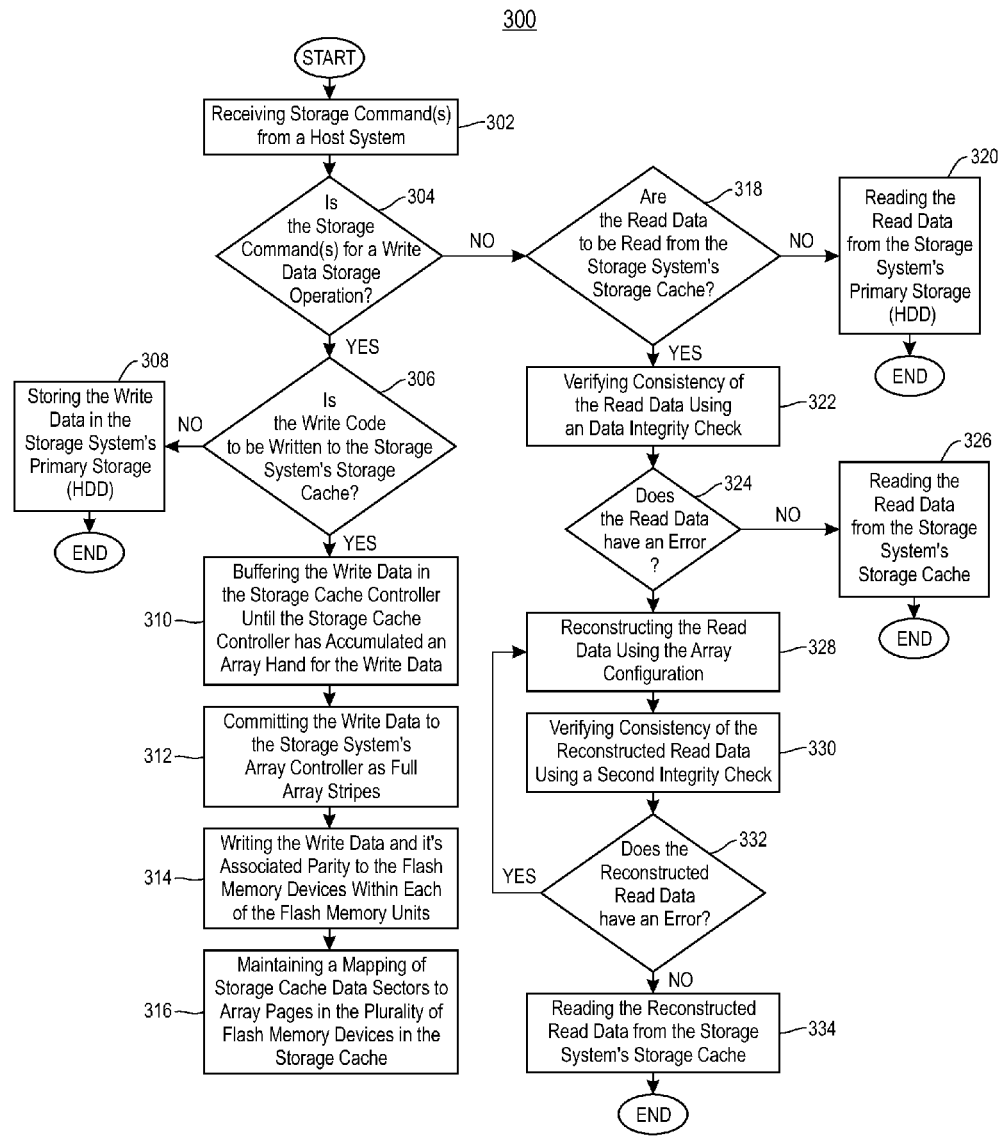
FIG. 3 is a flow chart of a method for accessing read data from and storing write data to a storage system with a storage cache comprised of flash memory units in a RAID configuration, according to one embodiment.

FIG. 3 is a flow chart of a method 300 for accessing read data from and storing write data to a storage system 102 with a storage cache 202 comprised of flash memory units 118a, 118b, 118c . . . 118n in a RAID configuration, according to one embodiment. In step 302, the storage system 102 receives storage command(s) from a host system 106. For example, host client systems request data storage requests from a storage system storing data that is accessed by the host client system. The data storage requests may include read data request operations and write data request operations.

The storage cache 202 is provisioned as a plurality of flash memory units 118a, 118b . . . 118n organized in an array configuration. According to embodiments of the invention, the flash memory devices 122a, 122b, 122c . . . 122n comprises consumer-grade flash memory devices. For example, the flash memory devices 122a, 122b, 122c . . . 122n may include, but is not limited to multi-level cell (MLC) NAND flash memory, or single-level cell (SLC) NAND flash memory. Most MLC flash memory supports limited or even no, partial page writes. Consumer-grade flash controllers typically use a copy on write process to avoid the limitation in page writes. For example, MLC covers both 4LC/2BC and 8LC/3BC technologies.

In an exemplary embodiment, the plurality of flash memory units 118a, 118b . . . 118n may comprise eSATA devices. For example, 32 GB eSATA devices. In another exemplary embodiment, the flash memory devices 122a, 122b, 112c . . . 122n comprise four flash memory devices in each of the plurality of flash memory units 118a, 118b, 118c . . . 118n. In another exemplary embodiment, the flash memory devices 122a, 122b, 122c . . . 122n are 8 GB each and have a 4 kB page user addressable page size and a 512 kB erase block size.

The flash memory units 118a, 118b, 118c . . . 118n are placed in a RAID configuration in one embodiment. For example, placing the flash memory units 118a, 118b, 118c . . . 118n behind the flash memory array controller 206 provides protection against flash unit failure, and allows hot replacing flash units. In addition to the potential for overall device failure, flash units suffer from a finite write endurance, which will also necessitate eventual flash unit replacement. According to one embodiment, the cache's functionality is optimized for the behavior of flash chips behind a flash memory array controller 206.

The array configuration may comprise various RAID schemes, according to embodiments of the invention. In one embodiment, the array configuration comprises a RAID 5. In another embodiment, the array configuration comprises a 3+P RAID 5 configurations. For example, a RAID 5 arrangement provides protection against device failure or hard errors from the flash memory devices 122a, 122b, 122c . . . 122n. The use of RAID 5 provides a benefit in read performance. For example, parity blocks are not read in a normal course of read operations. In addition, spreading the parity across the flash memory devices 122a, 122b, 122c . . . 122n provides more read bandwidth. Accordingly, the parity spreading has no effect on write operations, since write operations involve complete array lines and there are no update writes.

In one embodiment, the storage cache controller 110 accepts storage commands from the host system 106, and appears to host system 106 as if it were disk array controller. For example, the host system 106 and the portion of the storage system 102 above the storage cache controller 110 is not aware of the existence of a storage cache 202 comprised of flash memory units 118a, 118b, 118c . . . 118n during storage operations.

In step 304, the storage cache controller 112 determines whether the storage command(s) is for a write data storage operation or for a read data storage operation. In one embodiment, the storage cache controller 110 determines which requests should be passed to directly to the storage system's primary storage device 114 on the HDD array controller 208, and which should be handled by the storage cache 202.

The method proceeds to step 318, if the storage command(s) is for a read data storage operation. The method proceeds to step 306, if the storage command(s) is for a write data storage operation. In step 306, the storage cache controller 112 determines whether the write data is to be written to the storage system's storage cache (e.g., cache) or to the storage system's primary storage device 114 (e.g., stored, allocated). The method proceeds to step 308, if the write data is to be written to the storage system's primary storage device (HDD) 114. In step 308, the storage system 102 stores the write data in the storage system's primary storage device (HDD) 114.

The method proceeds to step 310 if the write data is to be written to the storage system's storage cache 202. In step 310, the storage cache controller 110 buffers the write data until the storage cache controller 110 has accumulated an array band for the write data. In one embodiment, the BLM 204 will buffer write data such that writes are issued to flash memory array controller 206 at multiples of the flash page size and multiples of the array configuration (i.e., RAID) stripe size. In one embodiment, the storage cache controller 110 operates in a log-structured manner, which ensures that write data is presented in sequential batches to the flash memory units 118a, 118b, 118c . . . 118n. In one embodiment, write data is presently sequentially in terms of location. In another embodiment, write data is presented sequentially in terms of time. During a write operation, the storage cache controller 110 buffers write data until it has accumulated a BLM band, at which point the write data is passed to flash memory array controller 206.

In step 312, the storage cache controller 110 commits the write data to the storage system's array controller as full array stripes. In one embodiment, the mapping at the output from array controller and the write data delivery from storage cache controller 110 ensures that data writes always occur as full RAID stripes. In another embodiment, write data is committed to the flash memory array controller at a granularity that allows subsequent write operations to occur at sequential stripe addresses. In another embodiment, data may be passed in smaller units, such a BLM stripe, to allow subsequent write operations to occur at sequential stripe addresses, which allows for a smaller buffer.

For example, the flash memory units 118a, 118b, 118c . . . 18n (e.g., consumer grade) have higher sequential write performance than random write performance. Therefore, the writing of data should therefore avoid small block random patterns, and be sufficiently sequential that the performance impact is minimized. For example, a sequential unit size of an erase block will typically result in good performance; however a unit size of multiple erase blocks may result in better performance.

In step 314, the flash memory array controller 206 (or the single array controller if there is not a dedicated flash array controller) writes the write data and it's associated parity to a plurality of flash memory devices. In step 316, the BLM 204 maintains a mapping of storage cache data sectors to array pages in the plurality of flash memory devices 122a, 122b, 122c . . . 122n in the storage cache 202.

In step 318, the storage cache controller 110 determines whether the read data is to be read from storage system's storage cache 202 or the storage system's primary storage (HDD) 114. The method 300 proceeds to step 320, if the read data is to be read from the storage system's primary storage (HDD) 114. In step 320, the HDD array controller 208 accesses (for example, reads) the read data from the storage system's primary storage device (HDD) 114. In one embodiment, the storage cache controller 110 determines whether data read from the storage system's primary storage (HDD) 114 should be written to the storage cache 202. Accordingly, data may written to the storage cache 202 for both host system 106 read and write operations.

The method 300 proceeds to step 322, if the read data is to be read from the storage system's storage cache 202. In step 322, the flash memory array controller 206 verifies consistency of the read data using a data integrity check during the read data operation. In one embodiment, verifying the consistency of the read data using the integrity check includes determining a location of a memory page to be read and an associated integrity check value on flash memory devices 122a, 122b, 122c ... 122n in each of the plurality of flash memory units 118a, 118b, 118c ... 118n.

The location of the memory page and the associated integrity check value can be determined using a lookup table. The memory page and the associated integrity check value (e.g., CRC) from each of a plurality of flash memory devices 122a, 122b, 122c ... 122n in each of the plurality of flash memory units 118a, 118b, 118c ... 118n are read. The flash memory array controller 206 computes a second integrity check value (e.g., CRC) from the memory page read.

In step 324, the flash memory array controller 206 determines if the read data has an error. In one embodiment, the flash memory array controller 206 compares the second integrity check value to the associated integrity check value. The read data are verified as being correct, if the second integrity check value and the associated integrity check value match. The read data are determined to have an error, if the second integrity check value and the associated integrity check value do not match.

The method 300 proceeds to step 326 if the read data does not have an error. The method 300 proceeds to step 328 if the read data does have an error. In step 326, the read data are verified as being correct and the read data are read from the storage cache 202. In step 328, the flash array controller 206 reconstructs the read data using the array configuration (i.e., RAID). Data required to reconstruct the read data for the memory page and the associated CRC are read from the array, if the read and written CRC values do not match. The storage system 202 treats the read data that has been read as a hard error (an erasure), allowing the RAID layer to reconstruct the data. In an embodiment with a 3+P RAID 5, other pages in an array stripe of a memory page are read. The read data for the memory page with the error is reconstructed and the associated written CRC is reconstructed. The CRC is computed from the reconstructed data for the memory page.

In step 330, the flash array controller 206 verifies consistency of the reconstructed read data using a second integrity check. In step 332, the method 300 determines whether the reconstructed read data has an error. The method 300 repeats step 328, if the reconstructed read data is not verified as being correct. For example, a hard error is returned, if the reconstructed written and read CRCs do not match. The method 300 proceeds to step 334, if the reconstructed read data are verified as being correct. In step 334, the flash memory array controller 206 accesses (i.e., reads) the reconstructed read data are read from the storage cache 202.

Figure 4:
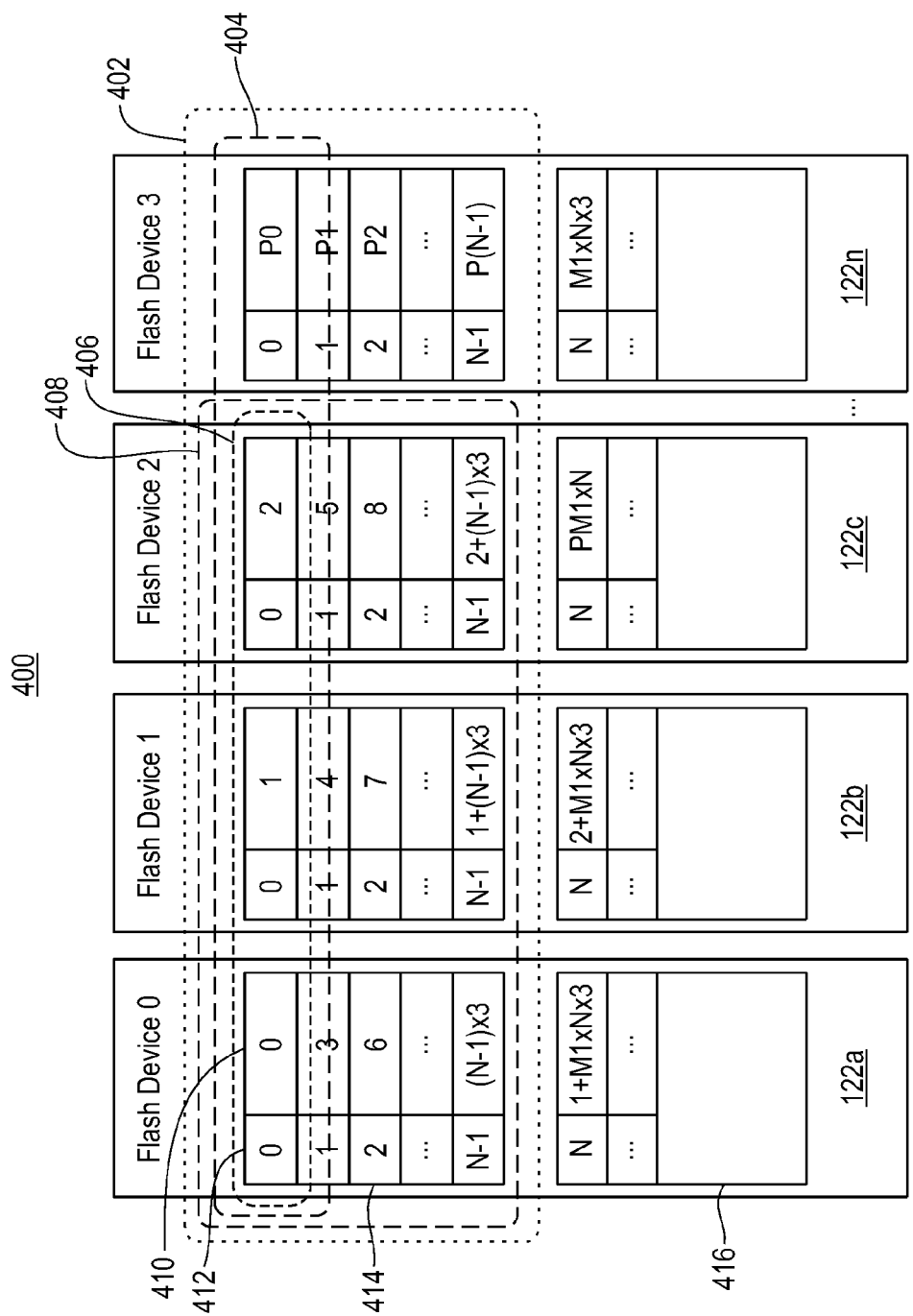
FIG. 4 illustrates storage cache array mapping from the cache layer across memory pages in flash memory devices for a storage cache comprised of flash memory units organized in a RAID configuration, according to one embodiment.

FIG. 4 illustrates storage cache array mapping 400 from the cache layer across memory pages in flash memory devices 122a, 122b, 122c ... 122n for a storage cache 202 comprised of flash memory units 118a, 118b, 118c ... 118n organized in a RAID configuration, according to one embodiment. The RAID level of the array is a RAID 5 configuration. The storage cache array mapping 400 illustrates array bands 402, array stripes 404, BLM stripes 406, BLM bands 408, BLM page index values 410, flash page index values 412, first erase block values 414, and second erase block values 416. In one embodiment, mapping is at the page level, where there will be multiple host data sectors in a page.

In one embodiment, the storage cache array mapping 400 at the output from flash memory array controller 206 and the write data delivery from storage cache controller 110 ensures that writes always occur as full RAID stripes. The preferred mapping from the cache layer is sequentially across a page of each flash memory device 122a, 122b, 122c ... 122n in the array. In another embodiment, the preferred mapping is repeated for each page in an erase block and for each subsequent erase block.

In one embodiment, the array stripe 404 is configured such that a page from each flash memory device 122a, 122b, 122c ... 122n creates a BLM stripe 406. The array stripe 404 comprises the BLM stripe 406 and a page from each parity device (flash memory device) 122a, 122b, 122c ... 122n. A set of BLM stripes comprise a BLM band 408. For example, a BLM band 408 is the sequential write unit of data presented to the array. The array computes the associated parity to create the array band 402. When a BLM band 408 of write data is sent to storage cache controller 110, this data and the associated parity is written sequentially to a set of flash memory devices 122a, 122b, 122c ... 122n.

The storage cache controller 110 buffers write data until it has accumulated BLM band 408, at which point the write data is passed to flash memory array controller 206. Data may be passed in smaller units, such a BLM stripe 406, to allow subsequent write operations to occur at sequential stripe addresses, which allows for a smaller buffer. In one embodiment, the BLM 204 manages the mapping of cache data sectors to BLM pages. In another embodiment, the BLM 204 manages the write buffer, determines when to post write data from the buffer to flash memory array controller 206. The BLM 204 works in concert with the flash memory array controller 205. Information such as the erase block size, page size and other detail of flash memory units 118a, 118b, 118c ... 118n are utilized to determine the mapping.

In one embodiment, if the flash memory units 118a, 118b, 118c ... 118n support the Trim command, the flash memory units 118a, 118b, 118c ... 118n can be informed that a given data location no longer holds valid information. For example, a Trim command allows the storage system 102 to know which data blocks are no longer in use and can be erased from the storage cache 202. The BLM 204 collects page invalidation information from the storage cache controller 110, and tracks the information according to BLM bands 408. A BLM line Trim command may be issued to flash memory array controller 206 when a complete BLM stripe 406 has been invalidated. The flash memory array controller 206 would then issue a Trim command for the full Array band, which ensures that the array stripes remain consistent, while allowing flash memory units 118a, 118b, 118c ... 118n to execute the Trim function. Trim may also occur at the array stripe 404 level (by issuing Trim for full BML stripes 406) and still retain array consistency. In another embodiment, the BLM 206 also controls issuing Trim commands to HDD array controller (HDD RAID controller) 208.

FIG. 5 is a lookup table 500 of flash memory write page assignments with in-line data integrity checks to verify consistency of read data from a storage cache 202 comprised of flash memory units 118a, 118b, 118c ... 118n organized in a RAID configuration, according to one embodiment. The exemplary lookup table 500 illustrates a flash page index 502, flash pages 504, write chunks 506 and a RAID level page index 508.

The flash memory array controller 206 uses a data integrity check to verify the correctness of read data. For example, a data integrity check includes a cyclic redundancy check (CRC) or polynomial code checksum. In one embodiment, a page of CRCs is inserted every 16$^{th}$ page, as illustrated in the exemplary lookup table 500. For example, the CRC pages could consist of 15 8-byte CRCs for each of the associated 4-kB pages. There is only a minimal performance penalty associated with writing CRC pages since the CRCs are written in-line with the data and the data is written in full BLM bands. A corresponding CRC is read when reading any of the associated pages to determine consistency of the read data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
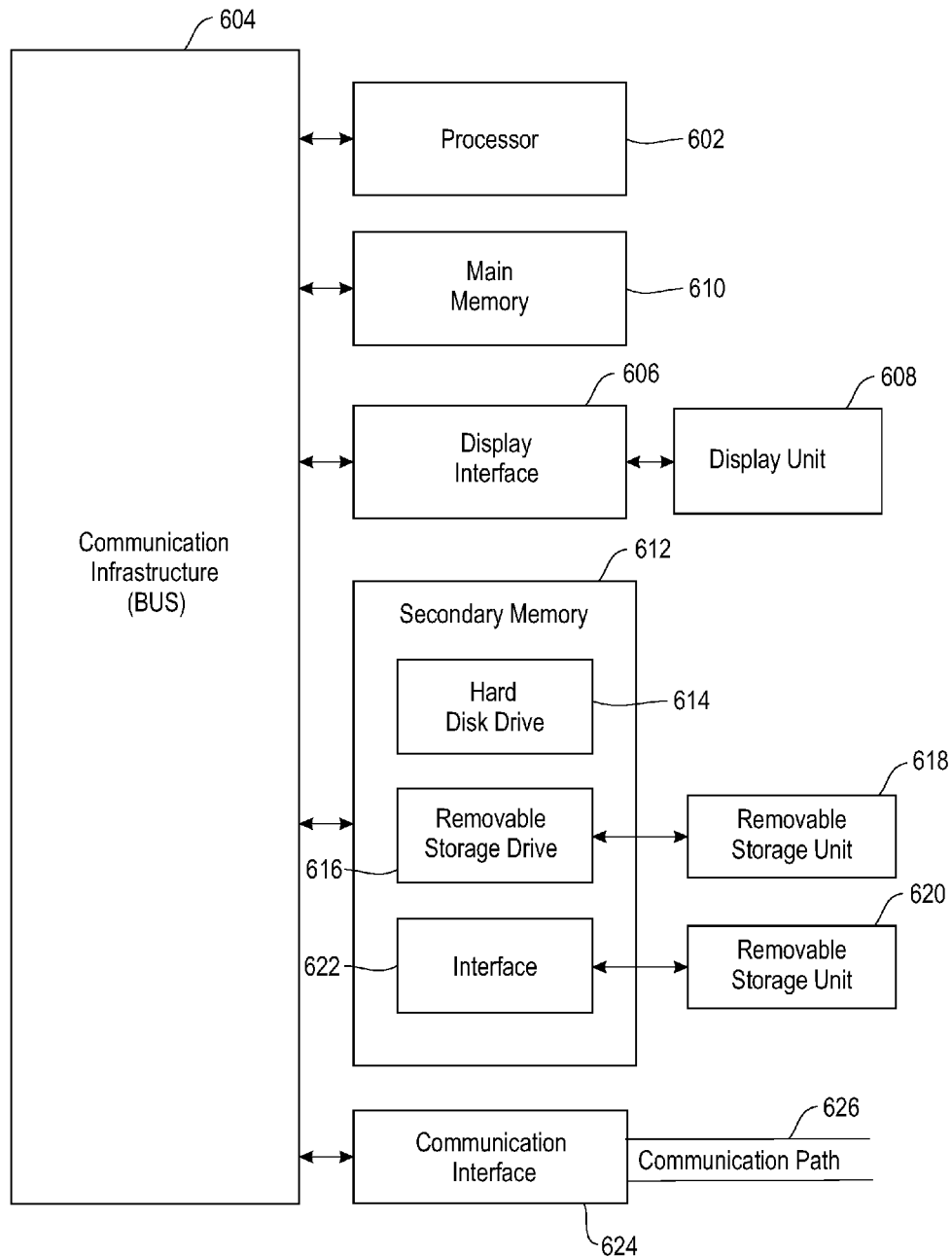
FIG. 6 is a high level block diagram showing an information processing system for implementing an embodiment of the present invention, according to one embodiment.

FIG. 6 is a diagram of a system for implementing an embodiment of the invention. The computer system includes one or more processors, such as a processor 602. The processor 602 is connected to a communication infrastructure 606 (e.g., a communications bus, cross-over bar, or network).

The computer system can include a display interface 606 that forwards graphics, text, and other data from the communication infrastructure 606 (or from a frame buffer not shown) for display on a display unit 608. The computer system also includes a main memory 610, preferably random access memory (RAM), and may also include a secondary memory 612. The secondary memory 612 may include, for example, a hard disk drive 616 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc., which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 620 and an interface 622. Examples of such means may include a program package and package interface (such as that found in video game devices), a removable memory chip (such as an EPROM, or PROM) and associated socket, and other removable storage units 620 and interfaces 622 which allow software and data to be transferred from the removable storage unit 620 to the computer system.

The computer system may also include a communications interface 626. Communications interface 626 allows software and data to be transferred between the computer system and external devices. Examples of communications interface 626 may include a modem, a network interface (such as an Ethernet card), a communications port, or a PCMCIA slot and card, etc. Software and data transferred via communications interface 626 are in the form of signals which may be, for example, electronic, electromagnetic, optical, or other signals capable of being received by communications interface 626. These signals are provided to communications interface 626 via a communications path (i.e., channel) 626. This communications path 626 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 610 and secondary memory 612, removable storage drive 616, and a hard disk installed in hard disk drive 616.

Computer programs (also called computer control logic) are stored in main memory 610 and/or secondary memory 612. Computer programs may also be received via a communication interface 626. Such computer programs, when run, enable the computer system to perform the features of the present invention as discussed herein. In particular, the computer programs, when run, enable the processor 602 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A storage system, comprising:
    a storage cache comprising a plurality of flash memory units organized in an array configuration, each of the plurality of flash memory units comprising a plurality of flash memory devices and a flash unit controller, wherein each flash unit controller manages data access and data operations for its corresponding flash memory devices;
    an array controller coupled to the plurality of flash memory units, the array controller manages data access and data operations for the plurality of flash memory units and organizes data as full array stripes;
    a primary storage device coupled to the array controller, the primary storage device stores data for the storage system; and
    a storage cache controller coupled to the array controller, wherein the storage cache controller:
        comprises a block line manager that buffers write data to be cached for a write operation until the storage cache controller has accumulated an array band, and commits write data to the array controller as full array stripes,
        receives storage commands from at least one host system, and
        determines:
            for a write data storage command, whether to store write data in the storage cache and/or in the primary storage device, and
            for a read data storage command, whether to access read data from the storage cache or from the primary storage device.

2. The storage system of claim 1, wherein if the write data is to be stored in the storage cache, the block line manager commits the write data to the array controller at multiples of a flash memory device page size and multiples of a stripe size of the array configuration.

3. The storage system of claim 1, wherein if the write data is to be stored in the storage cache, the array controller issues the write data to each of the plurality of flash units.

4. The storage system of claim 3, wherein the flash unit controller of each of the plurality of flash units writes the write data to at least one memory page in each of the plurality of flash memory devices.

5. The storage system of claim 1, the storage system adds an integrity check for each data page of write data in the storage cache.

6. The storage system of claim 5, wherein if data is to be read from the storage cache, the integrity check verifies consistency of the read data during a read operation from the storage cache.

7. The storage system of claim 6, wherein if the integrity checks fails, the array controller reconstructs the read data from the plurality flash memory units in the array configuration.

8. The storage system of claim 1, wherein if the read data is to be read from the primary storage, the block line manager commits the read from the primary storage to the array controller as full array stripes.

9. The storage system of claim 1, wherein if read data is to be read from the primary storage, the storage cache controller determines whether to cache the read data (from the primary storage) in the storage cache.

10. A method, comprising:
managing data access and data operations for a storage cache of a storage system, wherein the storage cache is provisioned as a plurality of flash memory units organized in an array configuration, and each of the plurality of flash memory units comprises a plurality of flash memory devices; and
receiving at least one storage command from a host system and:
for a write data storage command:
determining whether to store write data in the storage cache and/or in a primary storage device of the storage system, and
if the write data is to be stored in the storage cache, buffering the write data until a storage cache controller has accumulated an array band, and committing the write data to an array controller as full array stripes, and
for a read data storage command, determining whether to access the read data from the storage cache or from the primary storage device.

11. The method of claim 10, wherein committing the write data to the array controller as full array stripes comprises creating an array stripe for each page in the plurality of flash memory devices, wherein:
the full array stripes comprises the array stripe and a page from each of the plurality of flash memory devices,
a set of array stripes comprises an array band that is a sequential write unit of data presented to the array configuration, and
the array configuration computes an associated parity to create the array band.

12. The method of claim 10, further comprising:
issuing the write data from the array controller to each of the plurality of flash memory units; and
writing the write data and an associated parity to at least one memory page in each of the plurality of flash memory devices of each of the plurality of flash memory units in.

13. The method of claim 12, wherein the write data and the associated parity is written to the at least one memory page in each of the plurality of flash memory devices of each of the plurality of flash memory units in a sequential order.

14. The method of claim 10, wherein the write data is committed to the array controller at a granularity that allows subsequent write operations to occur at sequential stripe addresses.

15. The method of claim 10, further comprising:
managing a mapping of storage cache data sectors to array pages in the plurality of flash memory devices.

16. The method of claim 10, further comprising:
if read data are to be read from the storage cache, verifying consistency of the read data using an integrity check.

17. The method of claim 16, wherein verifying the consistency of the read data using the integrity check, comprises:
determining a location of a memory page to be read and an associated integrity check value on a plurality of flash memory devices in each of the plurality of flash memory units, wherein the location of the memory page and the associated integrity check value are determined using a lookup table;
reading the memory page and the associated integrity check value from each of a plurality of flash memory devices;
computing a second integrity check value from the memory page read;
comparing the second integrity check value to the associated integrity check value, wherein:
if the second integrity check value and the associated integrity check value match, the read data are verified as being correct and the read data are read from the storage cache, and
if the second integrity check value and the associated integrity check value do not match, the read data are determined to have an error.

18. The method of claim 17, further comprising:
if the read data are determined to have an error:
reconstructing the read data using the array configuration,
verifying consistency of the reconstructed read data using a second integrity check, and
if the reconstructed read data are verified as being correct, the reconstructed read data are read from the storage cache.

19. A computer program product, said program product comprising a non-transitory computer readable storage medium having computer usable program code embodied therewith, said program code being readable/executable by a storage cache controller to:
manage data access and data operations for a storage cache of a storage system, wherein the storage cache is provisioned as a plurality of flash memory units organized in an array configuration, and each of the plurality of flash memory units comprises a plurality of flash memory devices; and
receive at least one storage command from a host system and:
for a write data storage command:
determine whether to store write data in the storage cache and/or in a primary storage device of the storage system, and
if the write data is to be stored in the storage cache, buffer the write data until a storage cache controller has accumulated an array band, and commit write data to an array controller as full array stripes, and
for a read data storage command, determine whether to access the read data from the storage cache or from the primary storage device.

20. The computer program product of claim 19, wherein to commit the write data to the array controller as full array stripes comprises creating an array stripe for each page in the plurality of flash memory devices, wherein:
the full array stripes comprises the array stripe and a page from each of the plurality of flash memory devices,
a set of array stripes comprises an array band that is a sequential write unit of data presented to the array configuration, and
the array configuration computes an associated parity to create the array band.

21. The computer program product of claim 19, said program code being further configured to:

issue the write data from the array controller to each of the plurality of flash memory units, and write the write data and an associated parity to at least one memory page in each of the plurality of flash memory devices of each of the plurality of flash memory units.

22. The computer program product of claim 19, said program code being further configured to:

manage a mapping of storage cache data sectors to array pages in the plurality of flash memory devices.

23. The computer program product of claim 19, said program code being further configured to:

verify consistency of the read data using an integrity check.

24. The computer program product of claim 23, wherein to verify the consistency of the read data using the integrity check, comprises:

determining a location of a memory page to be read and an associated integrity check value on a plurality of flash memory devices in each of the plurality of flash memory units, wherein the location of the memory page and the associated integrity check value are determined using a lookup table;

reading the memory page and the associated integrity check value from each of a plurality of flash memory devices;

computing a second integrity check value from the memory page read;

comparing the second integrity check value to the associated integrity check value, wherein:

if the second integrity check value and the associated integrity check value match, the read data are verified as being correct and the read data are read from the plurality of flash memory devices, and if the second integrity check value and the associated integrity check value do not match, the read data are determined to have an error.

25. The computer program product of claim 24, wherein:

if the read data are determined to have an error, said program code being further configured to:

reconstruct the read data using the array configuration and verify consistency of the reconstructed read data using a second integrity check; and if the reconstructed read data are verified as being correct, said program code being further configured to read the reconstructed read data from the storage cache.

* * * * *